US007075973B2

United States Patent
Reznik et al.

(10) Patent No.: US 7,075,973 B2
(45) Date of Patent: Jul. 11, 2006

(54) MULTIUSER DETECTION OF DIFFERING DATA RATE SIGNALS

(75) Inventors: Alexander Reznik, Titusville, NJ (US); Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/731,456

(22) Filed: Dec. 9, 2003

(65) Prior Publication Data

US 2004/0202151 A1 Oct. 14, 2004

Related U.S. Application Data

(60) Provisional application No. 60/451,593, filed on Mar. 3, 2003.

(51) Int. Cl.
*H04B 1/69* (2006.01)
(52) U.S. Cl. .................. 375/148; 375/152; 375/346
(58) Field of Classification Search ............. 375/144, 375/148, 152, 316, 343; 455/463
See application file for complete search history.

(56) References Cited

U.S. PATENT DOCUMENTS

| | | | | |
|---|---|---|---|---|
| 6,128,486 A | * | 10/2000 | Keskitalo et al. | 455/422.1 |
| 6,615,030 B1 | * | 9/2003 | Saito et al. | 455/296 |
| 2002/0057730 A1 | * | 5/2002 | Karlsson et al. | 375/152 |
| 2004/0090906 A1 | * | 5/2004 | Moshavi et al. | 370/208 |

OTHER PUBLICATIONS

"Blind Adaptive Multiuser Detection for Asynchronous Dual-Rate DS?CDMA Systems" IEEE journal on Selected Areas in Communications vol. 19 No. 2 Feb. 2001.*

* cited by examiner

*Primary Examiner*—Kevin Burd
*Assistant Examiner*—Juan Alberto Torres
(74) *Attorney, Agent, or Firm*—Volpe & Koenig, P.C.

(57) ABSTRACT

A first detector receives a received signal and extracts the data signals from the received signal. A hard decision converter converts soft symbols outputted by the first detector into hard symbols. An interference canceller extracts the voice signals from the received signal. A second detector is connected to the output of the interference canceller, and extracts the individual voice signals. The second detector is a different detector type than the first detector.

10 Claims, 3 Drawing Sheets

MULTIUSER DETECTION OF DIFFERING DATA RATE SIGNALS

CROSS REFERENCE TO RELATED APPLICATION(S)

This application claims priority from U.S. provisional application No. 60/451,593 filed on Mar. 3, 2003, which is incorporated by reference as if fully set forth.

FIELD OF INVENTION

The present invention relates to a wireless communications network, and more particularly, for multiuser detection in a frequency division duplex system.

BACKGROUND

Signals can be sent in frequency division duplex (FDD) mode as shown in FIG. 1, for example a plurality of voice signals (V1, V2, and V3) and a plurality of data signals (D1 and D2). The voice signals are transmitted typically at a lower power than the data signals, since the voice signals can be transmitted with a lower data rate (such as by a higher spreading factor) without a significant loss in signal quality. For example, a voice signal can be transmitted with a spreading factor of 64 (64 chips per data bit), whereas a data signal may be transmitted with a spreading factor of four chips per data bit, due to the higher transmission rate. As illustrated in FIG. 1, several voice and data signals can be transmitted in the same spectrum. For voice communications (V1, V2 and V3), the voice signals usually need a small amount of system bandwidth, and accordingly transmission power. For high rate data signals, a larger bandwidth is required which typically requires higher transmission power levels.

The uplink of the FDD universal mobile telecommunications system (UMTS) supports a potentially large number of simultaneously transmitted codes. The signature sequences of the codes are highly non-structured with long codes having a period of one frame (38,400 chips). Short signature sequences are permitted as an option; however, even these short sequences have a period of 256 chips. By comparison, in time division duplex (TDD) mode where multiuser detection techniques are more typically employed, the signature sequences are far shorter and more rigidly structured, with a period of 16 chips.

The lack of structure of the signature sequence in FDD combined with a large number of users that the receiver may be required to support makes it infeasible to implement standard multi-user detectors (MUDs), such as decorrelator and minimum mean square error (MMSE) type receivers in such systems. Other popular MUD receiver structures are not necessarily suitable here either. For example, successive interference cancellers (SICs) do not perform well with a large number of codes of approximately the same power. Parallel interference cancellers (PICs), are complex and do not necessarily deliver significant performance improvements because their effectiveness falls as the total interference rises. Accordingly, PICs tend to perform poorly for recovery of voice user data in the presence of several high data rate users.

Additionally, there is significant amount of data shuffling that occurs between the physical channel demodulation and the channel decoders. This makes joint channel demodulation and decoding techniques nearly infeasible.

Accordingly, it is desirable to have alternate MUD-type receiver designs for such systems.

SUMMARY

A first detector receives a received signal and extracts the data signals from the received signal. A hard decision converter converts soft symbols outputted by the first detector into hard symbols. An interference canceller extracts the voice signals from the received signal. A second detector is connected to the output of the interference canceller, and extracts the individual voice signals. The second detector is a different detector type than the first detector.

BRIEF DESCRIPTION OF THE DRAWINGS

A more detailed understanding of the invention may be had from the following description of the preferred embodiments, given by way of example and to be understood in conjunction with the accompanying drawings, wherein.

DETAILED DESCRIPTION OF THE PREFERRED EMBODIMENT

Hereafter, a wireless transmit/receive unit (WTRU) includes, but is not limited, to a user equipment, a mobile station, a fixed or mobile subscriber unit, a pager, or any other type of device capable of operating in a wireless environment. When referred to hereafter, a base station includes, but is not limited to, a base station, a Node-B, a site controller, an access point, or any other interfacing device in a wireless environment. Although the background refers to an FDD wireless system, the embodiments can be applied to various wireless systems, where both high data and low data rate services are transmitted in a shared spectrum.

Figure 1:
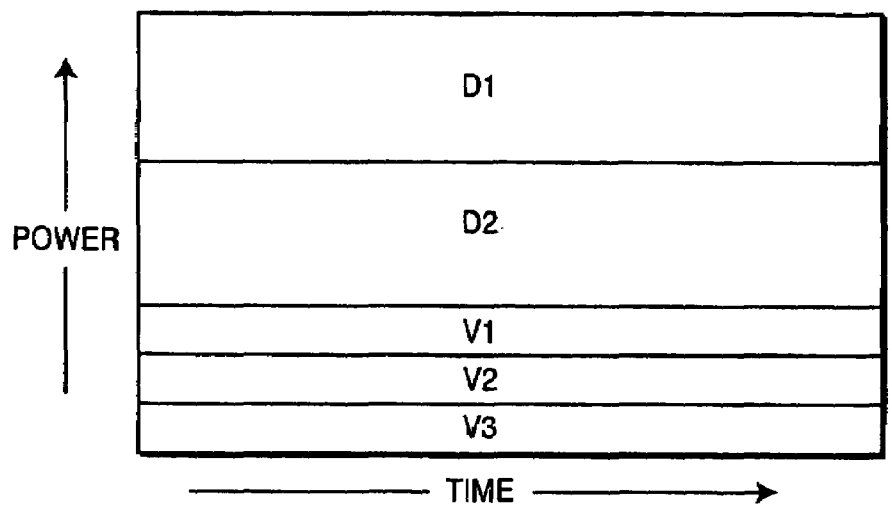
FIG. 1 is a block diagram of an example FDD transmission block with multiple voice and data signals.
Figure 2:
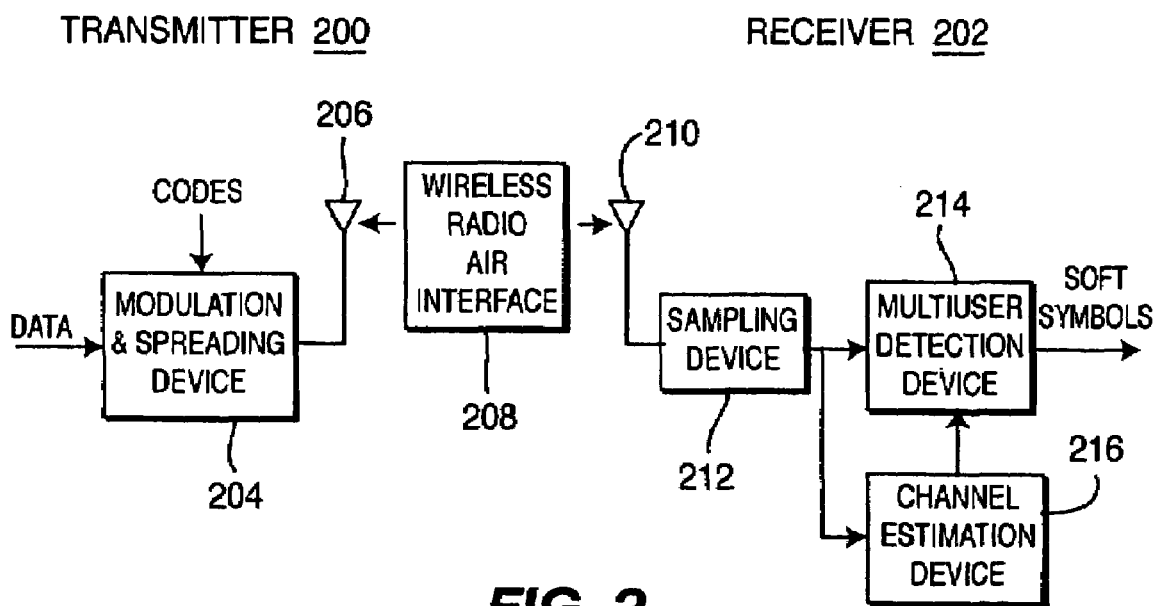
FIG. 2 is a simplified diagram of a transmitter and a receiver using a multiuser detector constructed in accordance with the present invention.

FIG. 2 illustrates an embodiment of a multiuser detector as used in a wireless communication system operating in accordance with the present invention. A transmitter 200 and a receiver 202 communicate with each other via a wireless radio air interface 208. The transmitter 200 may be located at a WTRU or at a base station. The receiver 202 may be located at the WTRU and/or the base station.

Data symbols to be transmitted to the receiver 202 are processed by a modulation and spreading device 204 at the transmitter 200. The modulation and spreading device 204 spreads the data with the codes and at a spreading factors assigned to the communications carrying the data. The communications are radiated by an antenna 206 or antenna array of the transmitter 200 through the wireless radio interface 208.

At the receiver 202, the communications, possibly along with other transmitters' communications, are received at an antenna 210 or antenna array of the receiver 202. The received signal is sampled by a sampling device 212, such as at the chip rate or at a multiple of the chip rate, to produce a received vector. The received vector is processed by a channel estimation device 216 to estimate the channel impulse responses for the received communications. The channel estimation device 216 uses a training sequence in the received communication to estimate the channel experienced by each communication. A multiuser detection device 214, uses the codes of the received communications and the estimated impulse responses to estimate soft symbols of the spread data.

Figure 3:
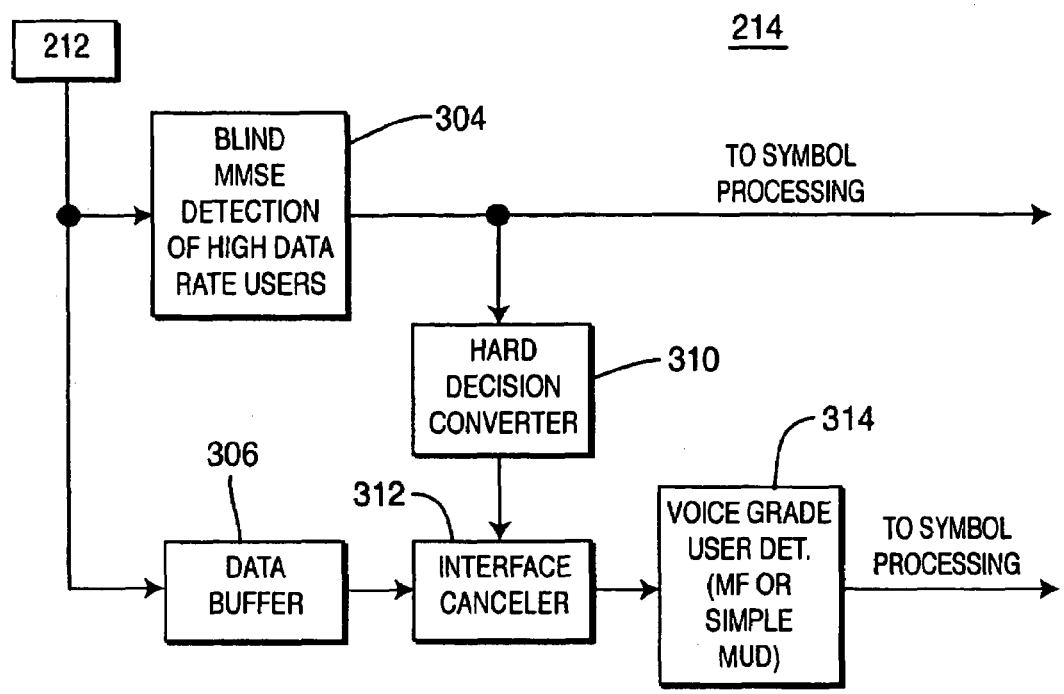
FIG. 3 is a block diagram of the multiuser detector shown in FIG. 2.

As shown in FIG. 3, the multiuser detector 214 receives the sampled signal from the sampling device 212. The samples are provided to a blind adaptive detector 304 and a data buffer 306. The outputted soft symbols from the detector 304 are sent to symbol processing to recover the high data rate data (not shown in FIG. 3) and to a hard decision converter 310. After the hard decision converter 310, the signal is sent to an interference canceller 312, where the signals of the high data rate users are removed from the sampled signal (the high data rate users' signals are passed to the interference canceller 312 via the data buffer 306), leaving voice signals to be processed by a voice grade user detector 314.

Preferably, the blind adaptive detector 304, uses MMSE detectors for the high data rate users, although other detectors may be used. In one embodiment, the detector 304 is based on a blind adaptive multiuser detector (MUD), a constrained optimization approach, and array processing techniques. These techniques are used in order to deliver MMSE performance to all of the high data rate users.

The detection of the high data rate users is followed by an interference cancellation stage in which the estimated signals sent by these users are removed from the received signal by the interference canceller 312. The remaining signal typically consists of a large number of voice grade users. These voice grade users can be processed by using standard matched-filtering techniques, e.g., RAKE receivers. Alternately, a low-complexity detection scheme or parallel interference cancellation techniques may be applied. To reduce the complexity of the voice user detection, it is desirable to use simpler detectors, although more complex detectors may be used. To illustrate, in alternate embodiments, it may be desirable to utilize more complex detector that could be used for other purposes by the WTRU or base station. In one embodiment, the detectors 304, 314 are blind detectors and do not have complete knowledge of the received codes. These components can be implemented on a single integrated circuit, multiple integrated circuits, discrete components or a combination of them.

Figure 4:
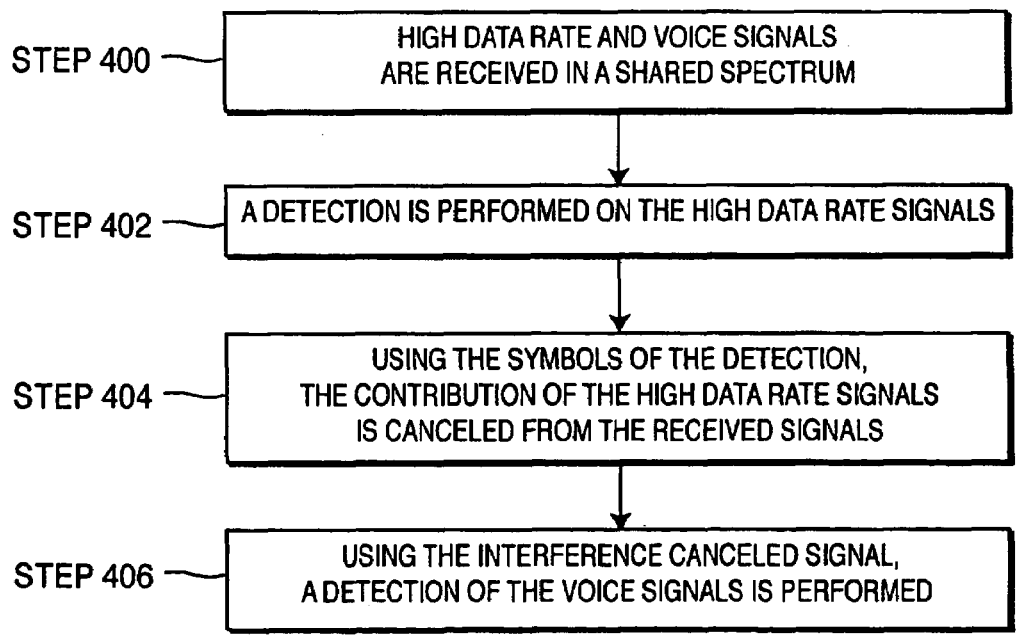
FIG. 4 is a flow chart of multiuser detection of differing data rate signals.
Figure 5A:
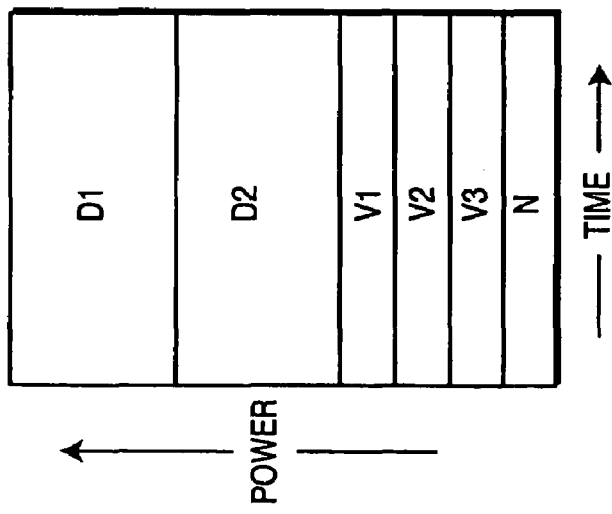
FIGS. 5A, 5B and 5C are illustrations of reception blocks.
Figure 5B:
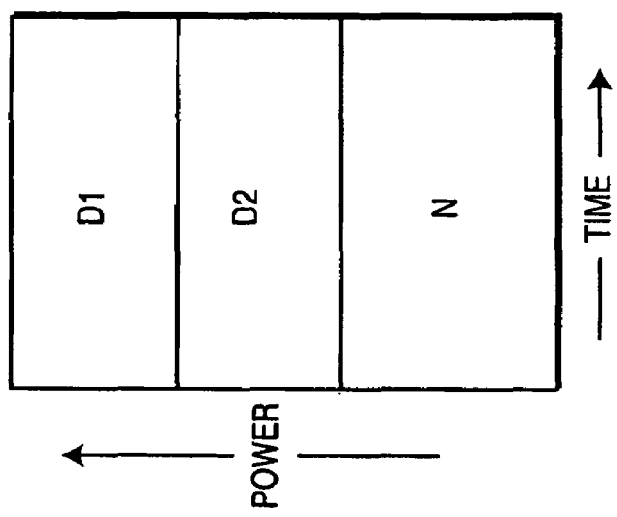
Figure 5C:
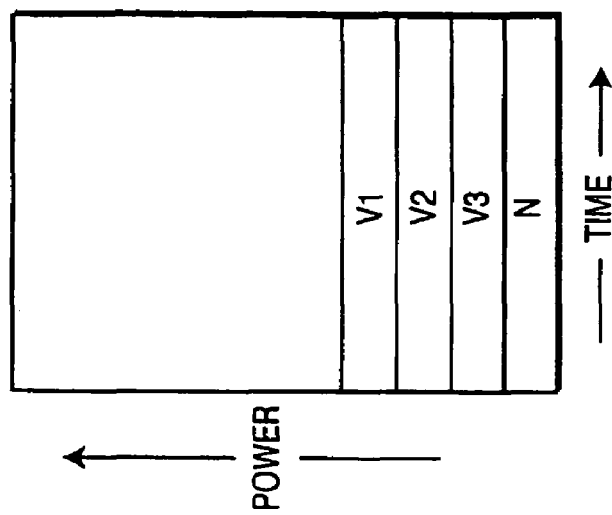

FIG. 4 is a flow chart for differing data rate multiuser detection, and is explained with the illustrations of FIGS. 5A, 5B and 5C. The receiver receives both high data rate and voice signals in a shared spectrum, step 400. As illustrated in FIG. 5A in terms of received power, two high data rate signals, D1 and D2, are received along with three voice signals, V1, V2, and V3, received along with three voice signals, V1, V2 and V3, and noise, N.

Preferably, a data detection is performed on the high data rate signals, step 402. FIG. 5B is an illustration of the treatment of the spectrum by the detector 304. The detector 304 treats the voice signals as noise, N. The high data rate signals can be determined by many means, such as by received power levels, a priori knowledge, etc. Since all of the signals are not processed by this detector, a lower complexity detector can be used. This is further facilitated by the detector 304 only processing high data rate signals typically having similar received power levels.

Using the symbols produced by the detector 304, the contribution of the high data rate signals is canceled from the received vector, step 404. After cancellation, the samples resemble FIG. 5C. As shown in FIG. 5C, the contribution of the high data rate signals, D1 and D2, is removed. A data detection is performed on the voice signals, V1, V2 and V3, step 406. If a detection of data signals V1, V2 and V3 was performed on the uncancelled signal of FIG. 5A, typically, D1, D2 and the noise would all be treated as noise and/or interference, instead of only the noise N as in FIG. 5C. For a typical implementation where high data rate services are being separated from voice services, the voice users are typically at similar power levels. Although the power levels for high data rate services may vary, these services typically have much higher power levels. Since data detectors typically perform better for equal power signals, the separation on the signals tends to improve performance.

The exemplary embodiment of the multiuser detector 214 provides three general functions: (1) support for a limited number of high performance high data rate users at a minimal cost to the basic (i.e., voice grade) capacity; (2) a low-complexity receiver that is effective for a large number of approximately equal power users (i.e., voice grade users); and (3) a receiver structure which supports a family of algorithms, rather than a single algorithm, so that certain parameters are adaptable to the specific needs of different potential customers. In alternate embodiments, some of the functions may be sacrificed in favor of other functionality.

While the description above partitions the users into two categories, data and voice, the partitioning is done because it is the natural partition for the application of third generation (3G) mobile telephony. The method itself is not limited to such partitioning and more levels may be defined with data detection and successive interference cancellation used repeatedly at each level, as shown in FIG. 3.

What is claimed is:

1. A system for multiuser detection of a received signal, the received signal including voice signals and data signals, wherein the voice signals are lower power than the data signals, said system comprising:
   a first detector having an input to receive the received signal and an output, said first detector extracting only the data signals from the received signal and outputting them as soft symbols;
   a hard decision converter having an input connected to said first detector output and an output, said hard decision converter converting the soft symbols output by said first detector into hard symbols;
   an interference canceller having a first input configured to receive the received signal and a second input connected to said hard decision converter output, and an output, said interference canceller canceling a contribution of the data signals from the received signal; and
   a second detector having an input connected to said interference canceller output, said second detector extracting only individual voice signals, said second detector being a different detector type than said first detector;
   wherein said first detector is a blind minimum mean square error detector and said second detector is a matched filter or a RAKE-receiver.

2. The system according to claim 1, further comprising a data buffer having an input to receive the received signal and an output coupled to the first input of the interference canceller.

3. The system according to claim 1, wherein said first detector output is also connected to a symbol processing device; and said second detector output is connected to said symbol processing device.

4. A method for multiuser detection of a received signal, the received signal including voice signals and data signals, wherein the voice signals are lower power than the data signals, the method comprising the steps of:
- storing the received signal;
- detecting only the data signals and extracting the data signals from the received signal;
- outputting the extracted data signals as soft symbols;
- converting the soft symbols into hard symbols;
- canceling the hard symbols from the stored received signal to extract the voice signals; and
- detecting only the individual voice signals, wherein the first and second detecting steps are performed by different types of detectors.

5. The method according to claim 4, wherein the first detecting step includes using a blind minimum mean square error detector.

6. The method according to claim 4, wherein the second detecting step includes using a matched filter.

7. The method according to claim 4, wherein the second detecting step includes using a RAKE-receiver.

8. A receiver comprising:
- an antenna for receiving a plurality of communication signals of differing power levels, the plurality of communication signals including a high power level group of data signals and a low power level group of voice signals;
- a high data rate data detection device for detecting only data of the high power level group of data signals;
- an interference canceling device for receiving the detected data of the high power level group of data signals and canceling a contribution of the high power level group detected data from the plurality of communication signals, as an interference canceled signal; and
- a low data rate data detection device for detecting data of the low power level group of voice signals from the interference canceled signal;
- wherein the high data rate data detection device comprises a blind minimum means square error data detection device and the low data rate data detection device comprises a matched filter or a Rake-receiver.

9. A wireless transmit/receive unit (WTRU) comprising:
- means for receiving a plurality of communication signals of differing power levels, the plurality of communication signals including a high power level group of data signals and a low power level group of voice signals;
- means for detecting only data of the high power level group of signals;
- means for receiving the detected data of the high power level group of data signals and canceling a contribution of the high power level group detected data from the plurality of communication signals, as an interference canceled signal; and
- means for detecting only data of the low power level group of voice signals from the interference canceled signal;
- wherein the high power means comprises a blind minimum means square error data detection device and the low power means comprises a matched filter or a RAKE-receiver.

10. An integrated circuit comprising:
- an input for receiving a plurality of communication signals of differing power levels, the plurality of communication signals including a high power level group of data signals and a low power level group of voice signals;
- a high data rate data detection device for detecting only data of the high power level group of signals;
- an interference canceling device for receiving the detected data of the high power level group of signals and canceling a contribution of the high power level group detected data from the plurality of communication signals, as an interference canceled signal; and
- a low data rate data detection device for detecting only data of the low power level group of voice signals from the interference canceled signal;
- wherein the high data rate data detection device comprises a blind minimum means square error data detection device and the low data rate data detection device comprises a matched filter or a RAKE-receiver.

* * * * *

UNITED STATES PATENT AND TRADEMARK OFFICE
CERTIFICATE OF CORRECTION

PATENT NO. : 7,075,973 B2  
APPLICATION NO. : 10/731456  
DATED : July 11, 2006  
INVENTOR(S) : Reznik et al.

Page 1 of 1

It is certified that error appears in the above-identified patent and that said Letters Patent is hereby corrected as shown below:

IN THE SPECIFICATION

At column 2, line 56, after the word "spreading", delete "factors" and insert therefor --factor --.

At column 3, line 38, after the word "use", delete "simplier" and insert therefor --simpler--.

At column 3, line 40, after the word "complex", delete "detector" and insert therefor --detectors--.

At column 3, lines 53-54, after "and V3,", delete "received along with three voice signals, V1, V2 and V3,".

At column 4, line 14, before the words "the signals", delete "on" and insert therefor --of--.

IN THE CLAIMS

At claim 8, column 5, line 39, after the word "minimum", delete "means" and insert therefor --mean--.

At claim 10, column 6, line 37, after the word "minimum", delete "means" and insert therefor --mean--.

Signed and Sealed this

Seventeenth Day of April, 2007

JON W. DUDAS  
*Director of the United States Patent and Trademark Office*